(12) United States Patent
Spencer et al.

(10) Patent No.: US 8,388,011 B2
(45) Date of Patent: Mar. 5, 2013

(54) SOUND MAKER FOR USE ON A BICYCLE

(76) Inventors: Troy Spencer, Charlotte, NC (US); Howard C. McClurd, Haddonfield, NJ (US)

( * ) Notice: Subject to any disclaimer, the term of this patent is extended or adjusted under 35 U.S.C. 154(b) by 99 days.

(21) Appl. No.: 13/033,190

(22) Filed: Feb. 23, 2011

(65) Prior Publication Data

US 2011/0260427 A1     Oct. 27, 2011

Related U.S. Application Data

(60) Provisional application No. 61/327,494, filed on Apr. 23, 2010.

(51) Int. Cl.
*A63H 33/28*     (2006.01)
(52) U.S. Cl. .................... 280/304.2; 280/288.4
(58) Field of Classification Search ............... 280/304.2, 280/288.4; 40/587, 668, 316; 446/404, 441, 446/189, 397, 409, 415
See application file for complete search history.

(56) References Cited

U.S. PATENT DOCUMENTS

| 2,940,215 | A |   | 6/1960 | Munro |
|---|---|---|---|---|
| 3,097,447 | A | * | 7/1963 | Peham et al. ............. 446/404 |
| 3,716,944 | A |   | 2/1973 | Mizrahi |
| 4,506,416 | A |   | 3/1985 | Ohminato et al. |
| 5,226,846 | A | * | 7/1993 | Onori ............................. 446/404 |
| 5,305,500 | A | * | 4/1994 | Tucker ........................ 24/30.5 R |
| 5,611,558 | A |   | 3/1997 | Randmae |
| 6,039,338 | A |   | 3/2000 | Perea et al. |
| 6,234,864 | B1 | * | 5/2001 | Onori ............................. 446/404 |
| D447,048 | S | * | 8/2001 | Beloff ............................ D8/395 |
| 6,565,107 | B1 |   | 5/2003 | Hartman |
| 7,344,429 | B2 |   | 3/2008 | Maxwell et al. |
| 7,694,988 | B2 |   | 4/2010 | Sturtevant |

OTHER PUBLICATIONS

Spokester Bicycle Noisemaker, www.spokester.com, May 18, 2011.

\* cited by examiner

*Primary Examiner* — Tashiana Adams
(74) *Attorney, Agent, or Firm* — Ashley Law Firm P.C.; Stephen S. Ashley, Jr.

(57) ABSTRACT

A sound generating apparatus includes a substantially U-shaped member having first and second panels, inner surface and outer surfaces. An arcuate section can be positioned on the inner surface of the U-shaped member for receiving and frictionally engaging a part of a bicycle fork. Two hollow ear sections can be positioned on the outer surface of the U-shaped member, each of the ear sections having an outer side and an inner side whereby exerting pressure on the outer sides of the ear sections widens an opening defined by the arcuate section to receive the bicycle fork part, and releasing the pressure on the ear sections allows the arcuate section to tighten around the bicycle fork part and frictionally engage the bicycle fork part. The arcuate section can define an arc of about 220 degrees.

20 Claims, 14 Drawing Sheets

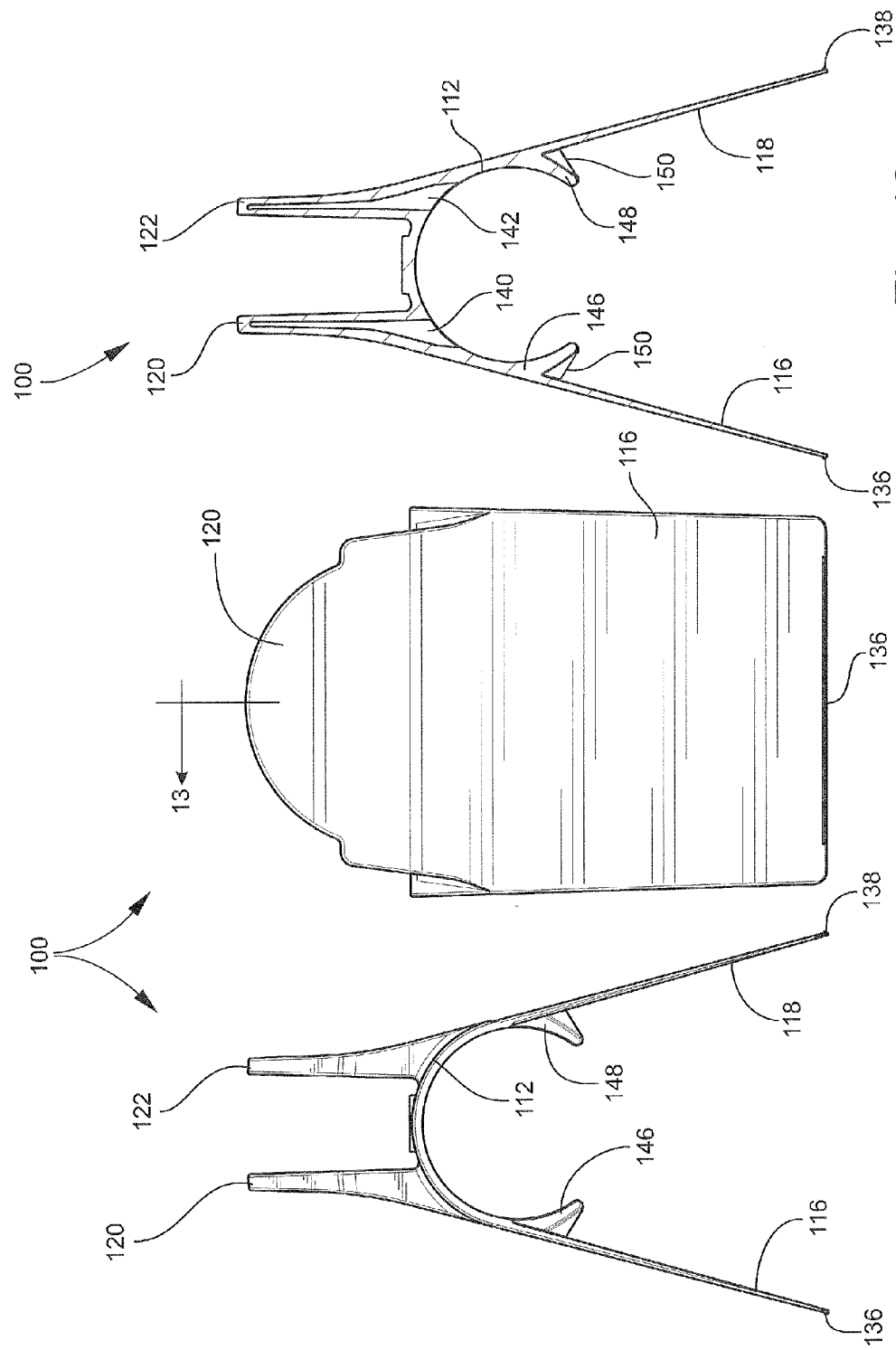

SOUND MAKER FOR USE ON A BICYCLE

This application claims priority to U.S. Provisional Patent Application No. 61/327,494, filed Apr. 23, 2010, which is incorporated herein. The present invention relates to a sound making apparatus adapted for use on a bicycle. The invention can be used on similar wheeled vehicles, such as tricycles and unicycles.

TECHNICAL FIELD AND BACKGROUND OF THE INVENTION

Sound making devices for bicycles are known in the art. Such devices typically are positioned on the bicycle frame so as to come into contact with the spokes of the bicycle as the user pedals the bicycle, causing the spokes to contact the device, which generates a desired sound. Such sound making devices have a particular appeal to young people. However, such known sound making devices have been found to have disadvantages, such as having a relatively complex construction requiring the attachment of multiple separate parts, which can compromise the stability of the device when mounted on a bicycle. Such existing sound makers for bicycles have been found to become easily dislodged by the force of the moving spokes of the bicycle. Other sound makers utilize relatively complex attachment mechanisms, such as nuts and bolts, for keeping the sound maker in place on the bicycle, however, such attachment mechanisms are difficult, if not completely impractical, for young children who are the typical users of such devices.

SUMMARY OF OBJECTS OF THE INVENTION

Therefore, one object of the present invention is to provide an apparatus that can generate a motor-like sound when positioned on a bicycle, and securely stay in place as the spokes of the bicycle contact the apparatus during use. Another object of the present invention is minimize the number of separate parts necessary to form the sound making apparatus. These and other objects of the invention can be obtained in the preferred embodiments of the invention described below.

One embodiment of the invention comprises a sound generating apparatus comprising a substantially U-shaped member having first and second panels, inner surface and outer surfaces. An arcuate section is positioned on the inner surface of the U-shaped member for receiving and frictionally engaging a part of a bicycle fork. First and second ear sections are positioned on the outer surface of the U-shaped member, each of the ear sections having an outer side and an inner side whereby exerting pressure on the outer sides of the ear sections widens an opening defined by the arcuate section to receive the bicycle fork part, and releasing the pressure on the ear sections allows the arcuate section to tighten around the bicycle fork part and frictionally engage the bicycle fork part.

According to another embodiment of the invention, the arcuate section is integrally formed on the inner surface of the U-shaped section, and the first and second ear sections are integrally formed on the outer surface of the U-shaped section.

According to another embodiment of the invention, the sound generating apparatus is formed of a single piece of plastic.

According to another embodiment of the invention, a ledge is formed proximate a bottom edge of each of the first and second panels.

According to another embodiment of the invention, the arcuate section defines an arc of about 220 degrees.

According to another embodiment of the invention, the first and second panels include rounded bottom edges.

According to another embodiment of the invention, the arcuate section comprises a first curved member positioned on the inner surface of the first panel, and a second curved member positioned on the inner surface of the second panel, wherein a distance between an edge of the first curved member and an edge of the second curved member define the opening in the arcuate section. Applying pressure on the outer sides of the ear sections increases the distance between the edge of the first curved member and the edge of the second curved member.

According to another embodiment of the invention, a first plurality of gussets are connected to the first curved member and the inner surface of the first panel to reinforce the first curved member, and a second plurality of gussets are connected to the second curved member and the inner surface of the second panel to reinforce the second curved member.

According to another embodiment of the invention, the first panel and the second panel define a central portion therebetween, and further comprising attachment means positioned on the central portion for mating with a complementary fastener.

According to another embodiment of the invention, the attachment means comprises a plurality of hook fasteners for mating with complementary loop fasteners.

According to another embodiment of the invention, the hook fasteners are integrally formed on the central portion.

According to another embodiment of the invention, the hook fasteners are adhered to the central portion.

According to another embodiment of the invention, the first and second ear sections are hollow.

According to another embodiment of the invention, a first elongate cavity formed in the inner surface of the U-shaped member proximate the first curved member, and a second elongate cavity formed in the inner surface of the U-shaped member proximate the second curved member, wherein the first cavity communicates with the first ear section, the second cavity communicates with the second ear section, and the first and second cavities define a central portion therebetween.

According to another embodiment of the invention, attachment means are positioned on the central portion for mating with a complementary fastener, and the attachment means comprises hook fasteners or loop fasteners.

According to another embodiment of the invention, a first plurality of gussets are connected to the first curved member and the inner surface of the first panel to reinforce the first curved member, and a second plurality of gussets are connected to the second curved member and the inner surface of the second panel to reinforce the second curved member.

According to another embodiment of the invention, a sound generating apparatus kit comprises a substantially U-shaped member having first and second panels, and inner and outer surfaces. An arcuate section positioned on the inner surface of the U-shaped member for receiving and frictionally engaging a part of a bicycle fork. First and second ear sections are positioned on the outer surface of the U-shaped member, with each of the ear sections having an outer side and an inner side such that exerting pressure on the outer sides of the ear sections widens an opening defined by the arcuate section to receive the bicycle fork part, and releasing pressure on the ear sections allows the arcuate section to tighten around the bicycle fork part and frictionally engage the bicycle fork part. A first fastener is positioned on the arcuate section, and the kit includes a second fastener for attaching to the bicycle fork and engaging the first fastener, so that the sound generating apparatus is securely held to the bicycle fork during use.

According to another embodiment of the invention, the first fastener comprises a plurality of hook fasteners, and the second fastener comprises an adhesive strip having a plurality of loop fasteners, such that the strip can be adhered to the bicycle fork.

According to another embodiment of the invention, a method for generating sound on a bicycle comprises providing a sound generating apparatus comprises the steps of providing a substantially U-shaped member having first and second panels, and having inner surface and outer surfaces, an arcuate section positioned on the inner surface of the U-shaped member for receiving and frictionally engaging a desired part of a bicycle fork, first and second ear sections positioned on the outer surface of the U-shaped member, each of the ear sections having an outer side and an inner side, such that exerting pressure on the outer sides of the ear sections widens an opening defined by the arcuate section to receive the bicycle fork part, and a plurality of hook fasteners positioned on the arcuate section. An adhesive strip having a plurality of loop fasteners is provided, and applied to the desired part of the bicycle fork. Pressure is exerted on the outer sides of the ear sections to widen the opening defined by the arcuate section, and the hook fasteners of the arcuate section are positioned against the loop fasteners on the adhesive strip. Pressure on the ear sections is released to allow the arcuate section to tighten around the bicycle fork part.

BRIEF DESCRIPTION OF THE DRAWINGS

FIG. 11 is a front elevation of the sound making apparatus of FIG. 7;

FIG. 12 is a side elevation of the sound making apparatus of FIG. 7;

FIG. 13 is a cross sectional view along line 12 of FIG. 12 of the sound making apparatus of FIG. 7;

DESCRIPTION OF THE PREFERRED EMBODIMENTS OF THE INVENTION AND BEST MODE

Figure 1:
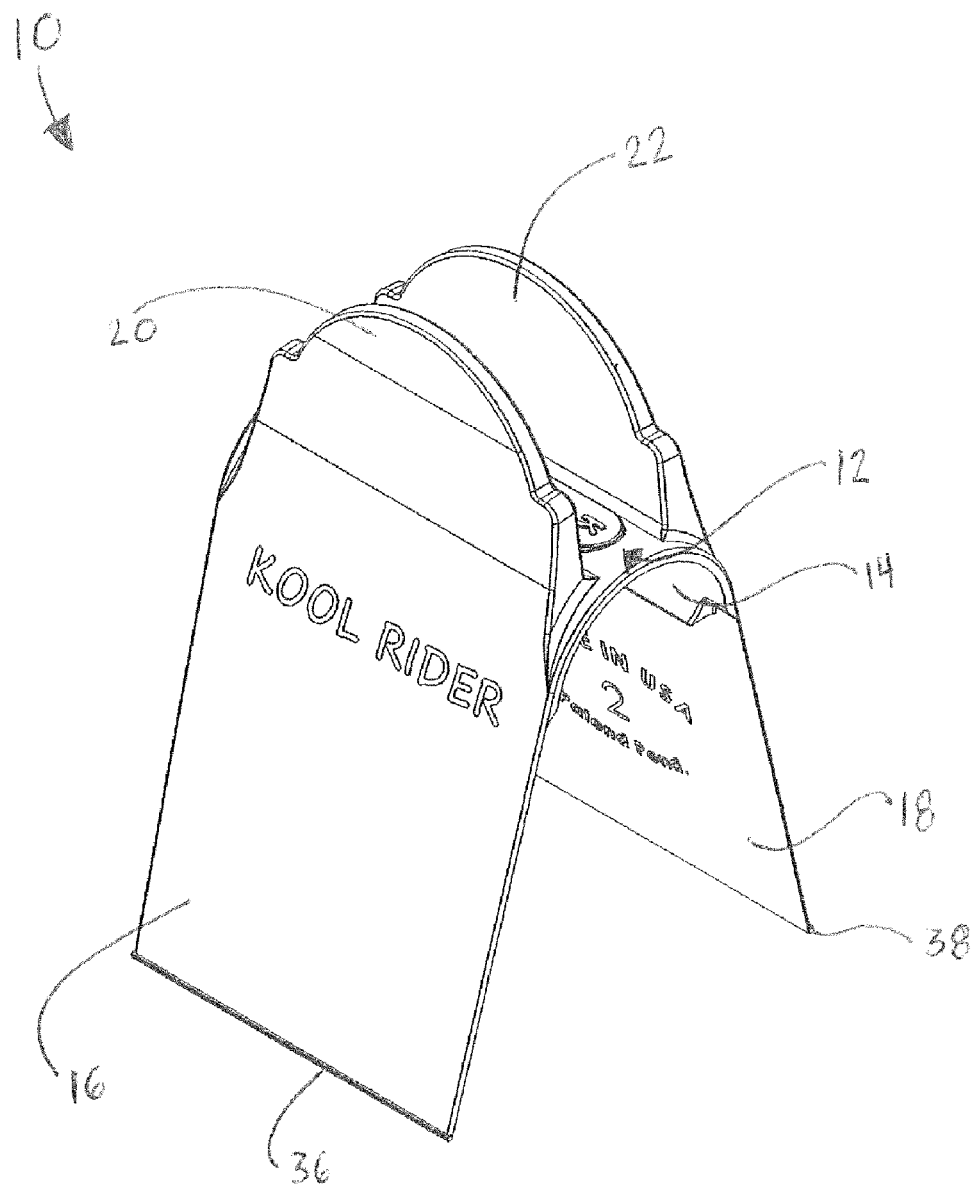
FIG. 1 is a perspective view of a sound making apparatus according to a preferred embodiment of the invention.

A sound making apparatus for use on a bicycle or similar conveyance according to a preferred embodiment of the invention is illustrated in FIGS. 1-6, and shown generally at reference numeral 10. As shown in FIG. 1, the assembly 10 comprises a substantially U-shaped center section 12, and two substantially flat panels 16, 18. Preferably, the panels 16, 18 are approximately 2.5 inches wide and 3.0 inches long, approximately 2.75 inches apart, and have a thickness of about 0.02 inch. Two ear portions, 20, 22, are formed on the outer surface of the center section 12 and extend outwardly therefrom, as shown in FIGS. 1-4.

Figure 4:
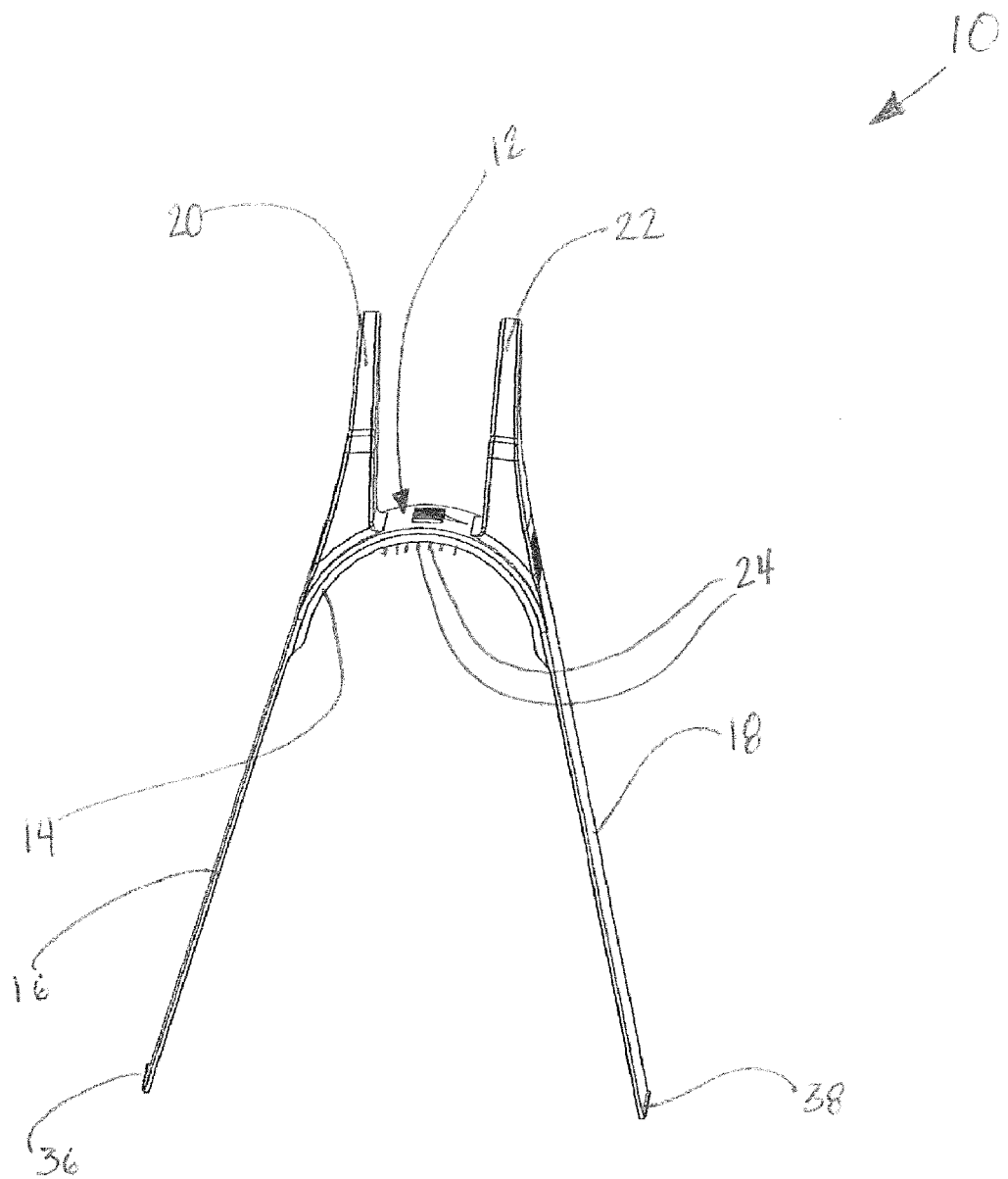
FIG. 4 is a front elevation of the sound making apparatus of FIG. 1.
Figure 5:
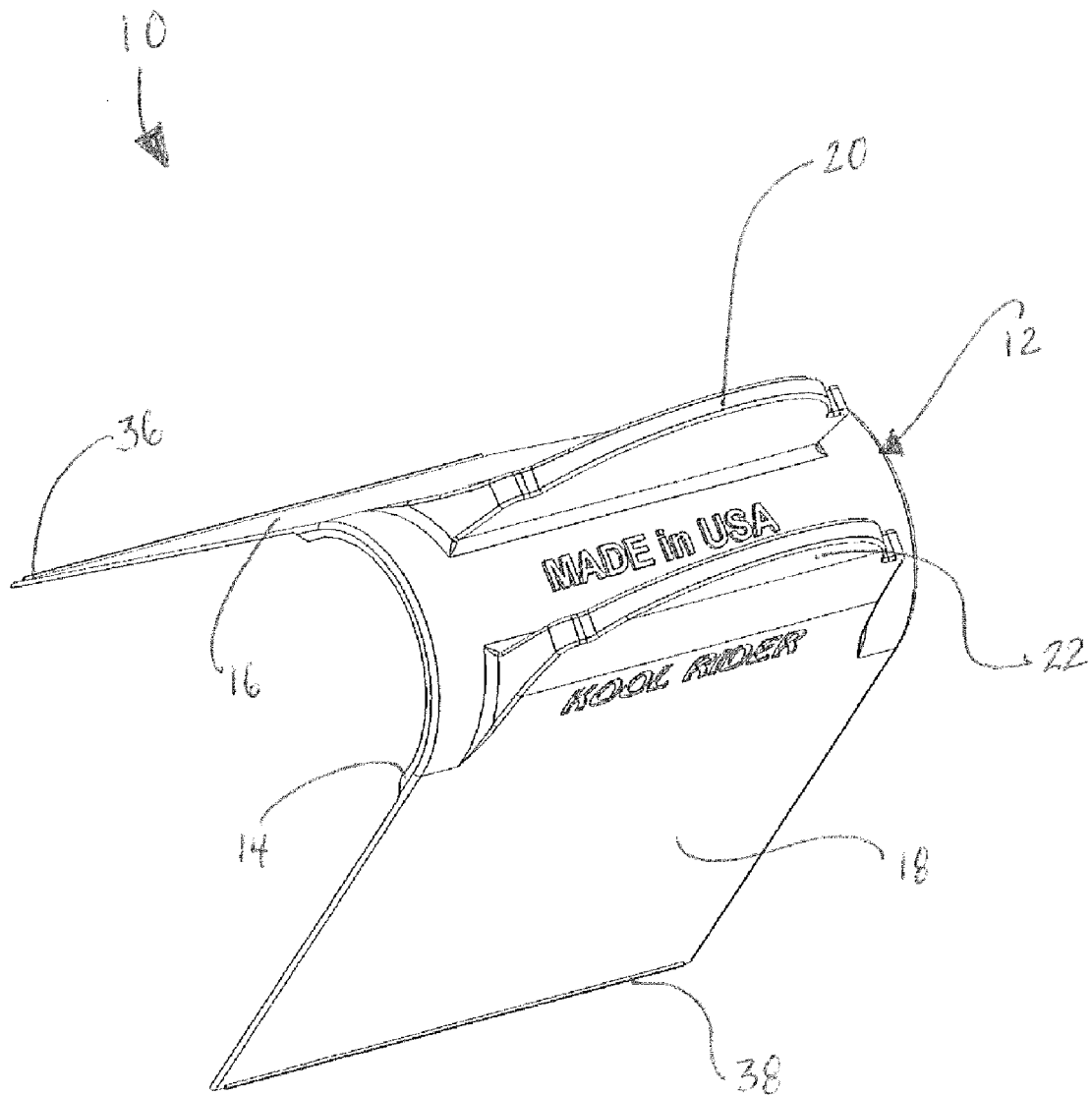
FIG. 5 is another perspective view of the sound making apparatus of FIG. 1.
Figure 6:
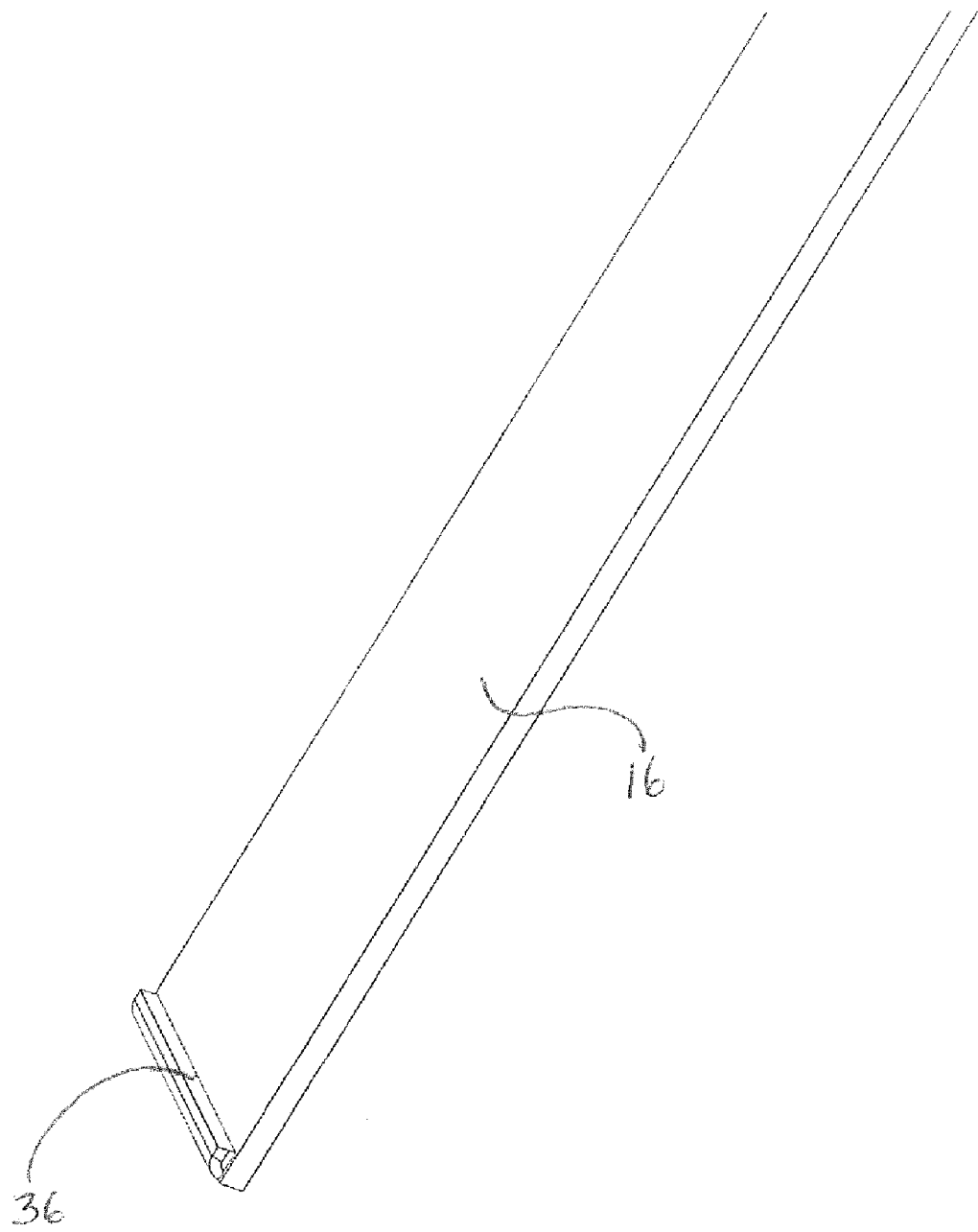
FIG. 6 is a partial perspective view of the sound making apparatus of FIG. 1.

A slight ledge 36, 38, is formed at the bottom edge on of each panel 16, 18, respectively, and projects outwardly from the outer surface of the panels 16, 18, as shown in FIGS. 1, 4 and 6. The ledges 36, 38 facilitate the placement of a sticker or other decorative article on the outer surface of the panels 16, 18.

Figure 2:
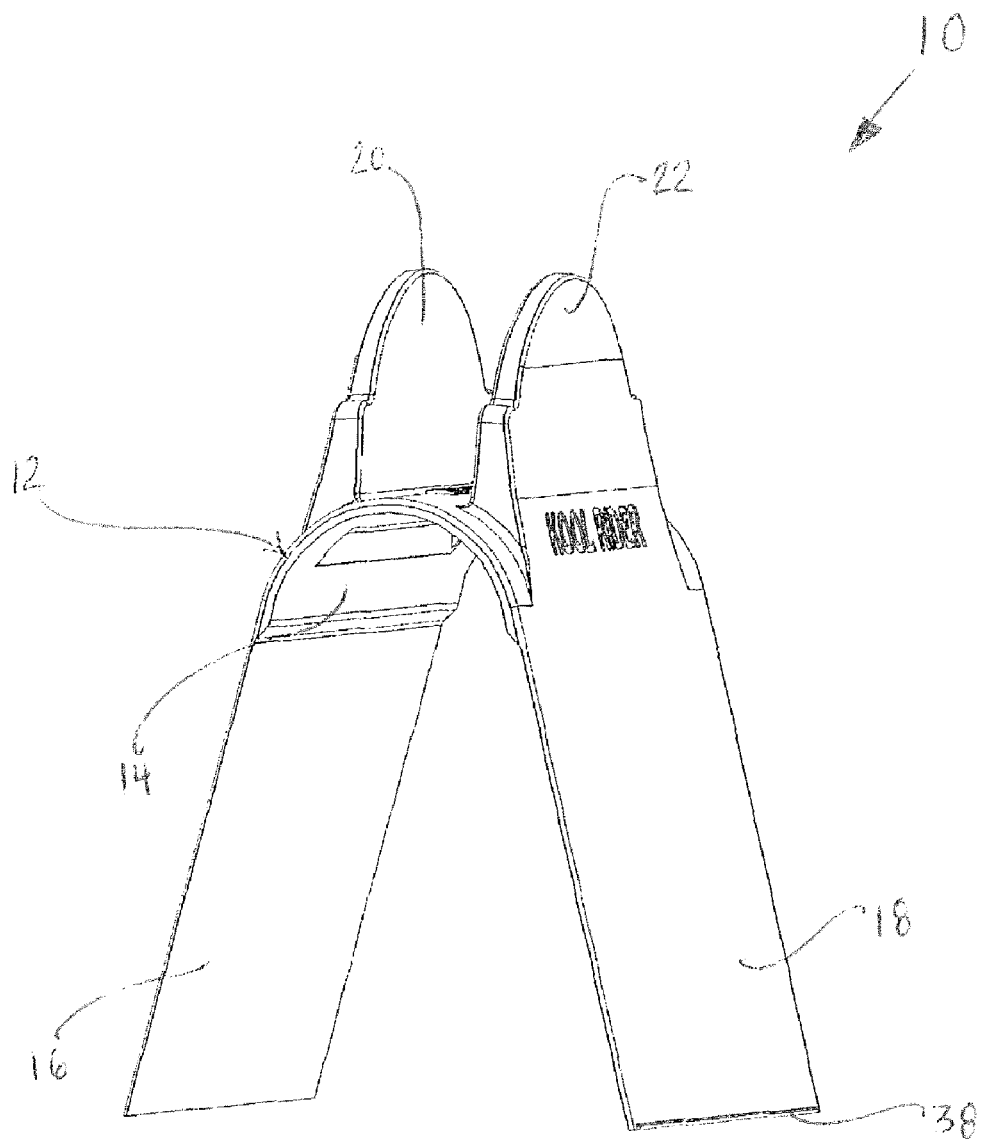
FIG. 2 is another perspective view of the sound making apparatus of FIG. 1.
Figure 3:
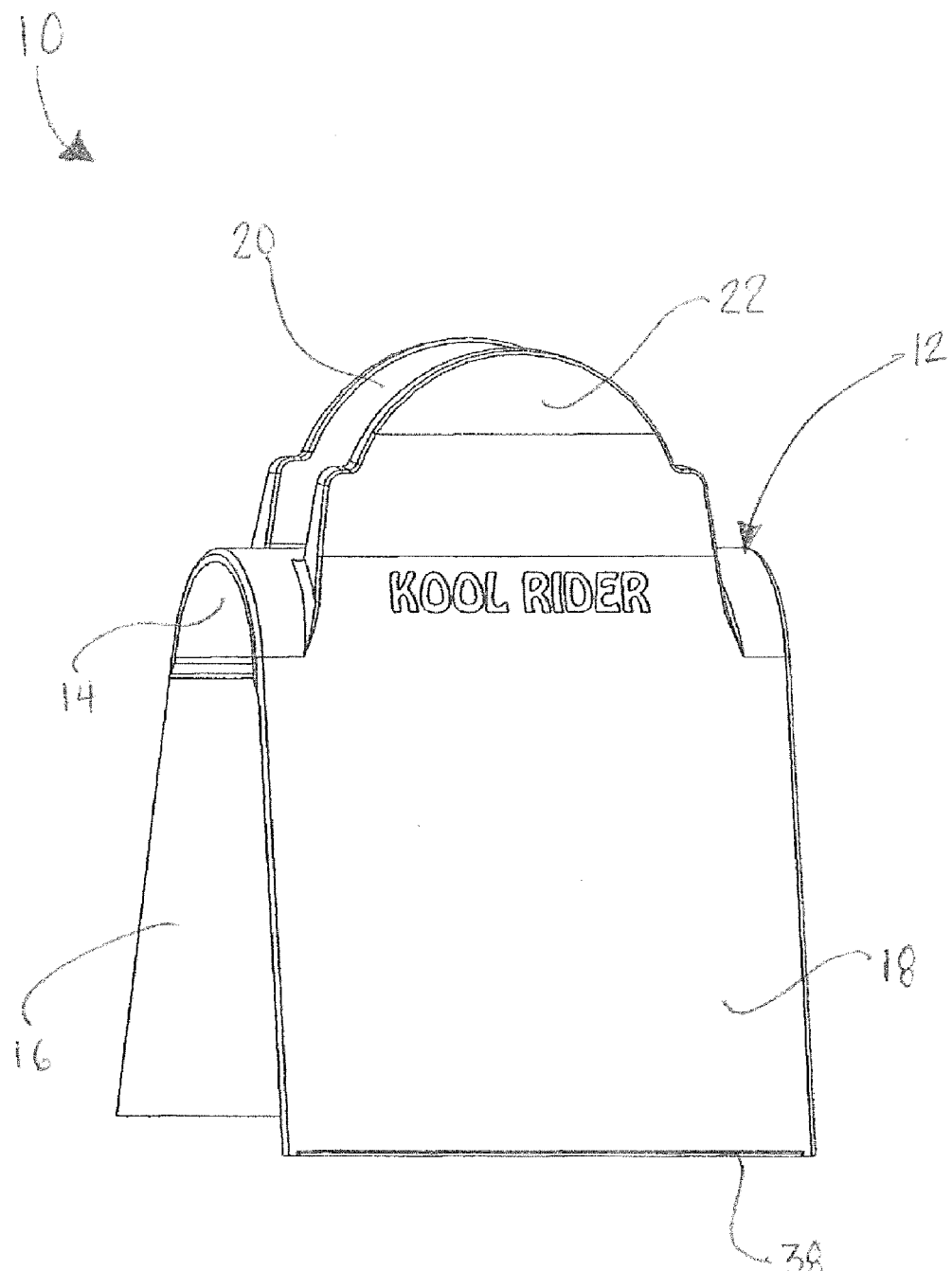
FIG. 3 is another perspective view of the sound making apparatus of FIG. 1.

A semi-circular platform 14 is formed on the inner surface of the arcuate center section 12, as shown in FIGS. 2 and 4. A section of fasteners, such as hook fasteners 24, are positioned on the semi-circular platform 14. The fastening section 24 can be attached to the platform 14 by an adhesive or other suitable attachment means. Except for the hook fasteners section 24, the apparatus 10 is preferably formed from a single piece of plastic.

Complimentary fasteners, such as loop fasteners, are provided for the user to attach to a bicycle or similar wheeled conveyance. Preferably, a section of loop fasteners having an adhesive that is exposed by peeling away a back layer is provided to the user with the apparatus 10. The user peels away the back and positions the loop fasteners section on a front or rear fork of the bicycle, depending on where the user wishes to mount the apparatus 10.

In a preferred method of using the apparatus 10, the user grasps the apparatus 10 by the ears 20, 22 and presses the ears 20, 22 together to widen the semi-circular platform 14. In this widened condition, the user places the semi-circular platform 14 over the fork of the bicycle such that the hook fasteners 24 on the platform 14 mate with the loop fasteners on the fork of the bicycle, and the panels 16, 18 are positioned within the path of the spokes of the bicycle wheel. The user then releases the ears 20, 22, and the platform 14 returns to its normal width, thereby tightening its grip on the bicycle fork and facilitating tight mating between the hook fasteners 30 of the apparatus and the loop fasteners on the bicycle fork. This results in a secure attachment of the apparatus 10 to the bicycle that can withstand the force of repeated contact with the bicycle spokes. The engaged hook and loop fasteners act as a shock absorber, thereby easing the torque on the apparatus 10 resulting from contact with moving spokes.

The user pedals the bicycle causing the wheels to turn and the spokes to contact the two panels 16, 18. The successive contact of the spokes against the two panels 16, 18 produce a syncopated sound similar to a twin cylinder engine of a motorcycle. When the user desires to remove the apparatus 10 from the bicycle, he presses the ears 20, 22 together to widen the semi-circular platform 14, and pulls the apparatus 10 away from the bicycle.

In an alternative embodiment of the invention, a sound making apparatus comprises a center U-shaped section with two panels that are attached to the center section by nuts and bolts, or other suitable fastener.

Figure 7:
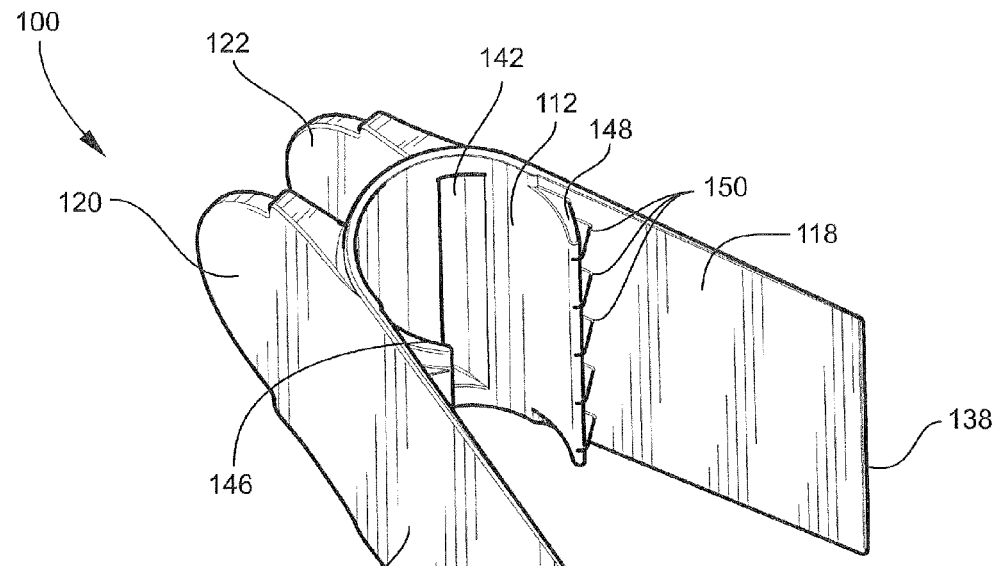
FIG. 7 is a perspective view of a sound making apparatus according to another preferred embodiment of the invention.
Figure 8:
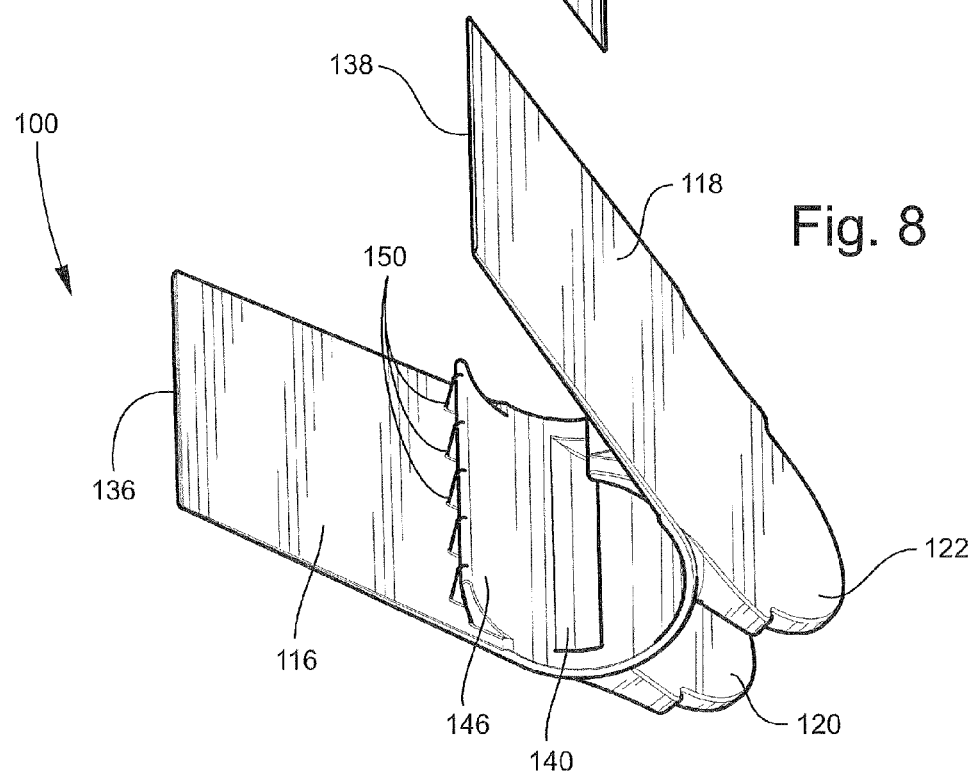
FIG. 8 is another perspective view of the sound making apparatus of FIG. 7.
Figure 9:
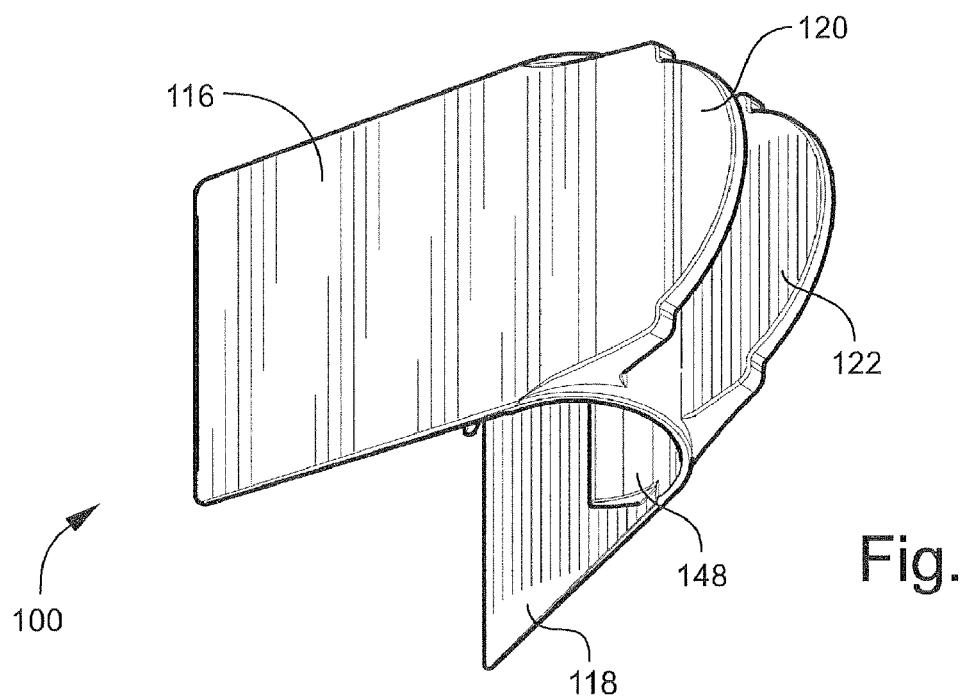
FIG. 9 is another perspective view of the sound making apparatus of FIG. 7.
Figure 10:
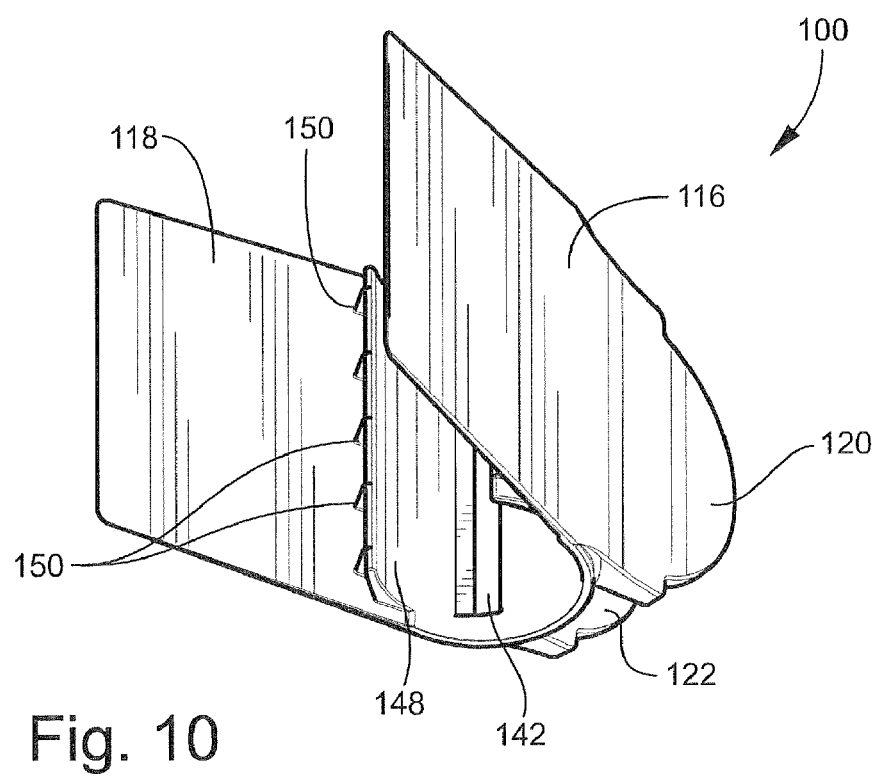
FIG. 10 is another perspective view of the sound making apparatus of FIG. 7.

A sound making apparatus according to another preferred embodiment of the invention is illustrated in FIGS. 7-20, and shown generally at reference numeral 100. As shown in FIG. 7, the assembly 100 comprises a substantially U-shaped member comprised of an arcuate center section 112, and two substantially flat panels 116, 118. Preferably, the panels 116, 118 are approximately 2.5 inches wide and 3.0 inches long, approximately 2.75 inches apart, and have a thickness of about 0.02 inch.

Two ear portions, 120, 122, are formed on the outer surface of the center section 112 and extend outwardly therefrom. Preferably, each of the ear portions 120, 122 are hollow and communicate with cavities 140, 142 formed in the inner surface of the arcuate section 112, shown in FIGS. 13 and 20. The hollow nature of the ears 120, 122 contribute significantly to the sound generated by the sound making apparatus 100 by increasing the volume.

Figure 16:
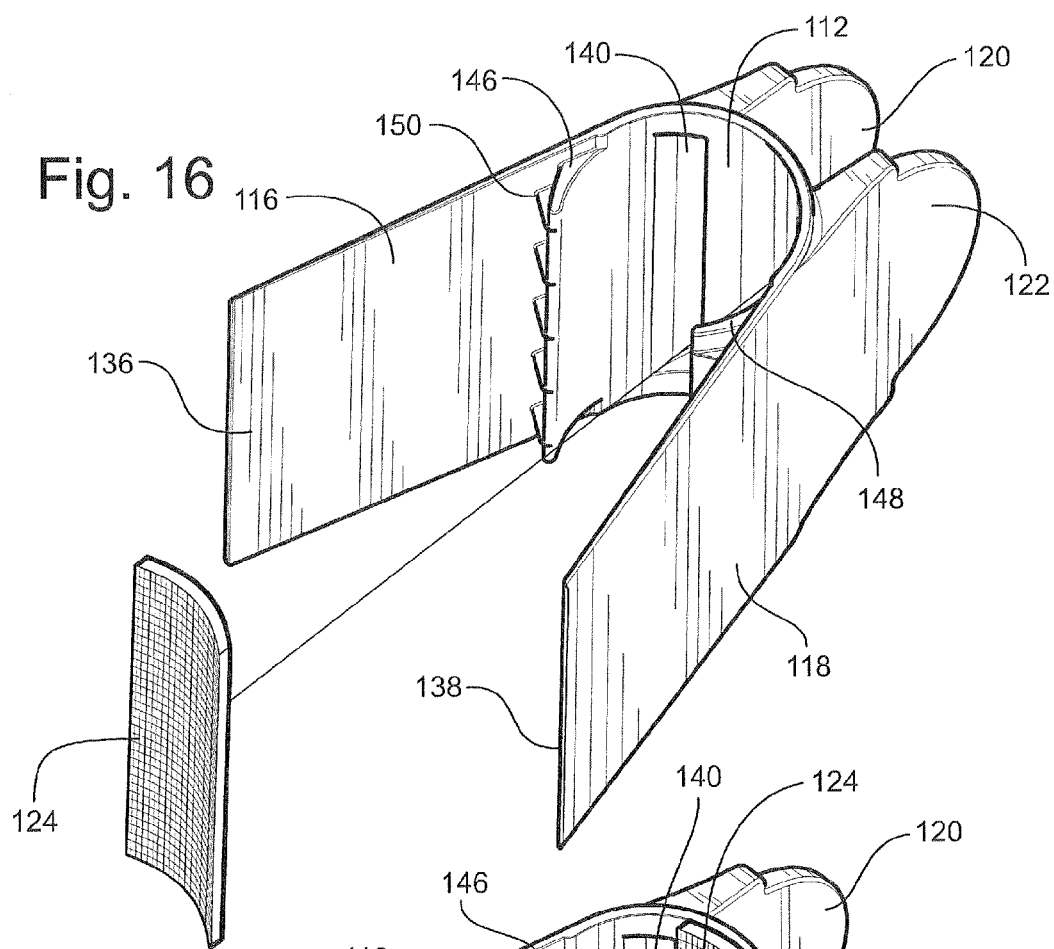
FIG. 16 is a schematic view of the sound making apparatus of FIG. 7.
Figure 17:
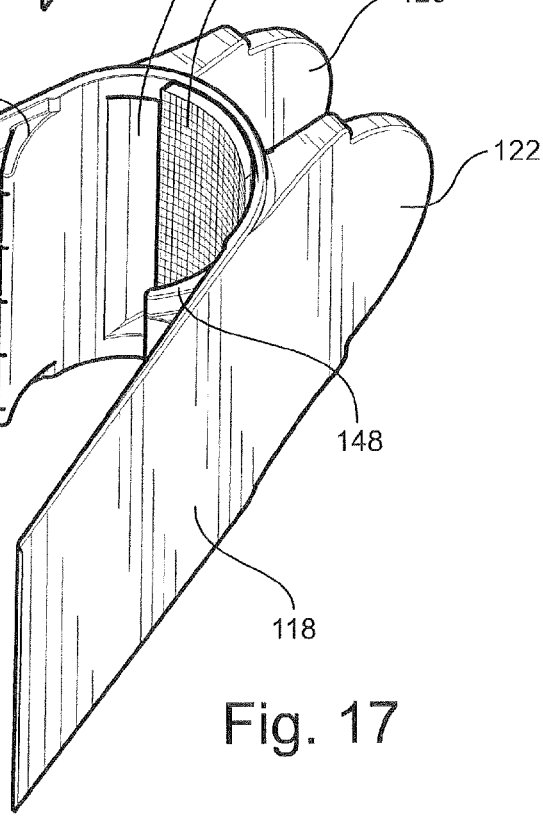
FIG. 17 is another perspective view of the sound making apparatus of FIG. 7.
Figure 20:
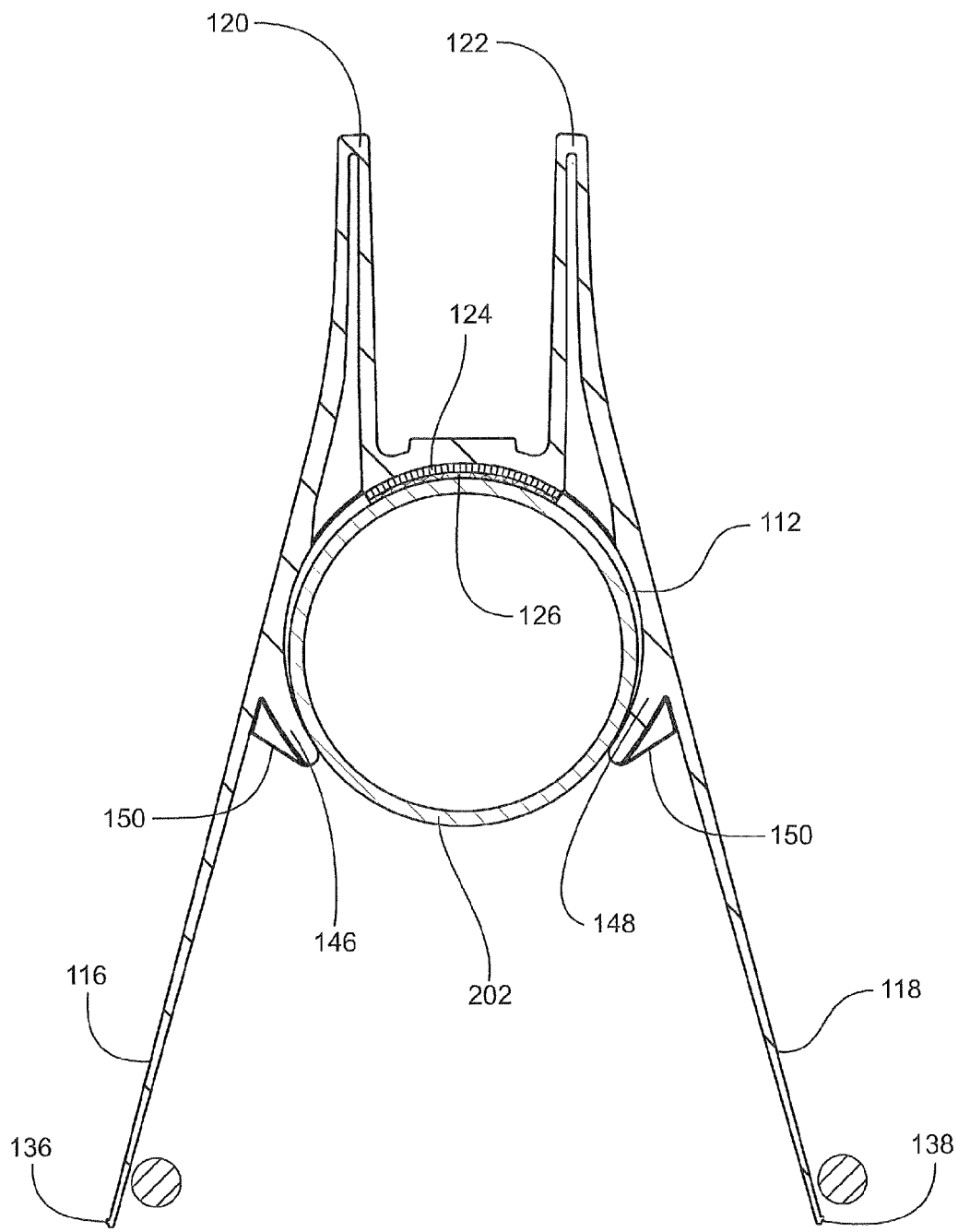
FIG. 20 is cross sectional view taken along line 19 of FIG. 19 of the sound making apparatus of FIG. 7.

A slight ledge 136, 138, can be formed at the bottom edge on of each panel 116, 118, respectively, and projects outwardly from the outer surface of the panels 116, 118, as shown in FIGS. 16, 17 and 20. The ledges 136, 138 can facilitate placement of a sticker or other decorative article on the outer surface of the panels 116, 118.

Preferably, the bottom edges of each panel 116, 118 are rounded, as shown in FIG. 12, rather than square edged. The rounded bottom edges of the panels 116, 118 are important to the sound and longevity of the apparatus 100, as they facilitate smooth contact of the panels 116, 118 on from one spoke to another and minimize a snagging effect that occurs in square edged panels. As such, the rounded bottom edge panels 116, 118 contact each following spoke quicker and harder, the release is exhilarated, and the resulting sound is louder than with square edged panels. Also, the rounded bottom edge panels 116, 118 minimize ripping or tearing, contributing to the longevity of the apparatus 100.

Figure 14:
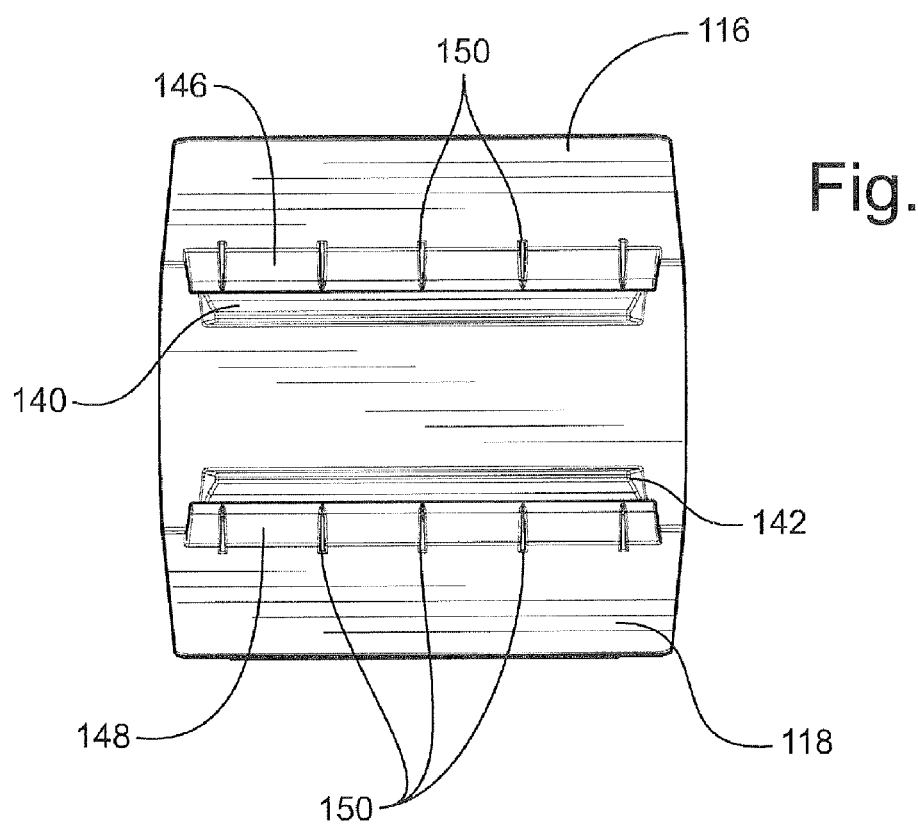
FIG. 14 is a bottom view of the sound making apparatus of FIG. 7.
Figure 15:
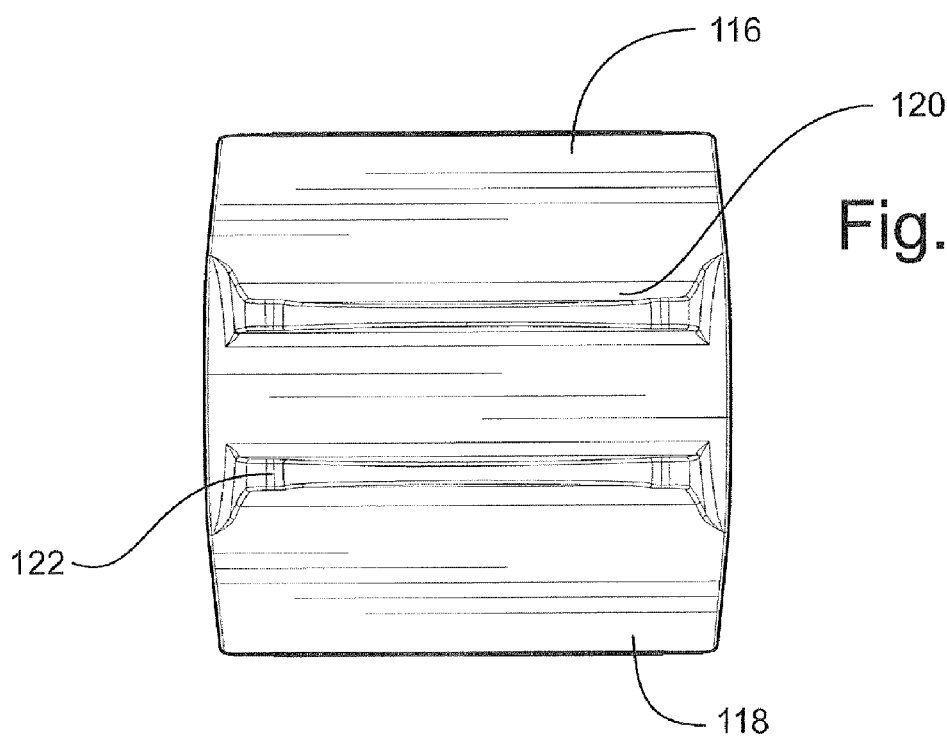
FIG. 15 is a top view of the sound making apparatus of FIG. 7.

As shown in FIGS. 7, 14 and 20, the arcuate center section 112 comprises two elongate members 146, 148 formed on the inner surface of the panels 116, 118, respectively. The elongate members 146, 148 curve inwardly toward each other such that the arcuate center section 112 defines an arc of about 220 degrees, as shown in FIGS. 11 and 13.

A plurality of gussets 150 can be positioned between the elongate members 146, 148 and the inner surface of the panels 116, 118 to provide structural reinforcement and help distribute torque evenly across the width of the panels 116, 118. Preferably, there are five gussets 150 formed between the outer side of each elongate member 146, 148 and the inner surface of the panels 116, 118, respectively.

Exerting pressure on the outer sides of the ear portions 120, 122 increases the distance between the edge of the first curved member 146 and the edge of the second curved member 148 to allow for the arcuate section 112 to fit over the fork 202 of a bicycle 200. Releasing the pressure from the ear portions 120, 122 allows the arcuate section 112 to return to its at rest position defining a 220 degree arc. The 220 degree arc defined by the arcuate section 112 is critical for maintaining the apparatus 100 on the bicycle fork 202. If less than 220 degrees, the apparatus 100 is more likely to fall off when the bicycle begins to move. If greater than 220 degrees, it may be exceedingly difficult for the user to open the arcuate section 112 wide enough to get the apparatus 100 onto the bicycle fork 202.

A section of fasteners, such as hook fasteners 124, are positioned on the arcuate center section 112, between the two cavities 140, 142 formed in the arcuate section 112. The fastening section 124 can be attached to the arcuate section 112 by an adhesive or other suitable attachment means. Except for the hook fasteners section 124, the apparatus 100 is formed from a single piece of plastic. The fastening section 124 can be a strip having a plurality of hook fasteners 124 on one side, and an adhesive on the other side. The fastening section 124 is adhered to the arcuate section 112 between the cavities 140, 142, as shown in FIGS. 16 and 17. Alternatively, hook fasteners can be integrally formed on the arcuate section 112 of the apparatus 100, such as in the process described in U.S. Pat. No. 5,656,226, which is incorporated herein. As such, the apparatus 100 can be made of a single piece of plastic, or other suitable material.

A complementary fastener, such as a plurality of loop fasteners, can be provided with the apparatus 100 for the user to attach to the bicycle fork 202, or similar wheeled conveyance. Preferably, the complementary fastener comprises a strip 126 having a plurality of loop fasteners on one side, and an adhesive back side covered by a peelable plastic covering.

Figure 18:
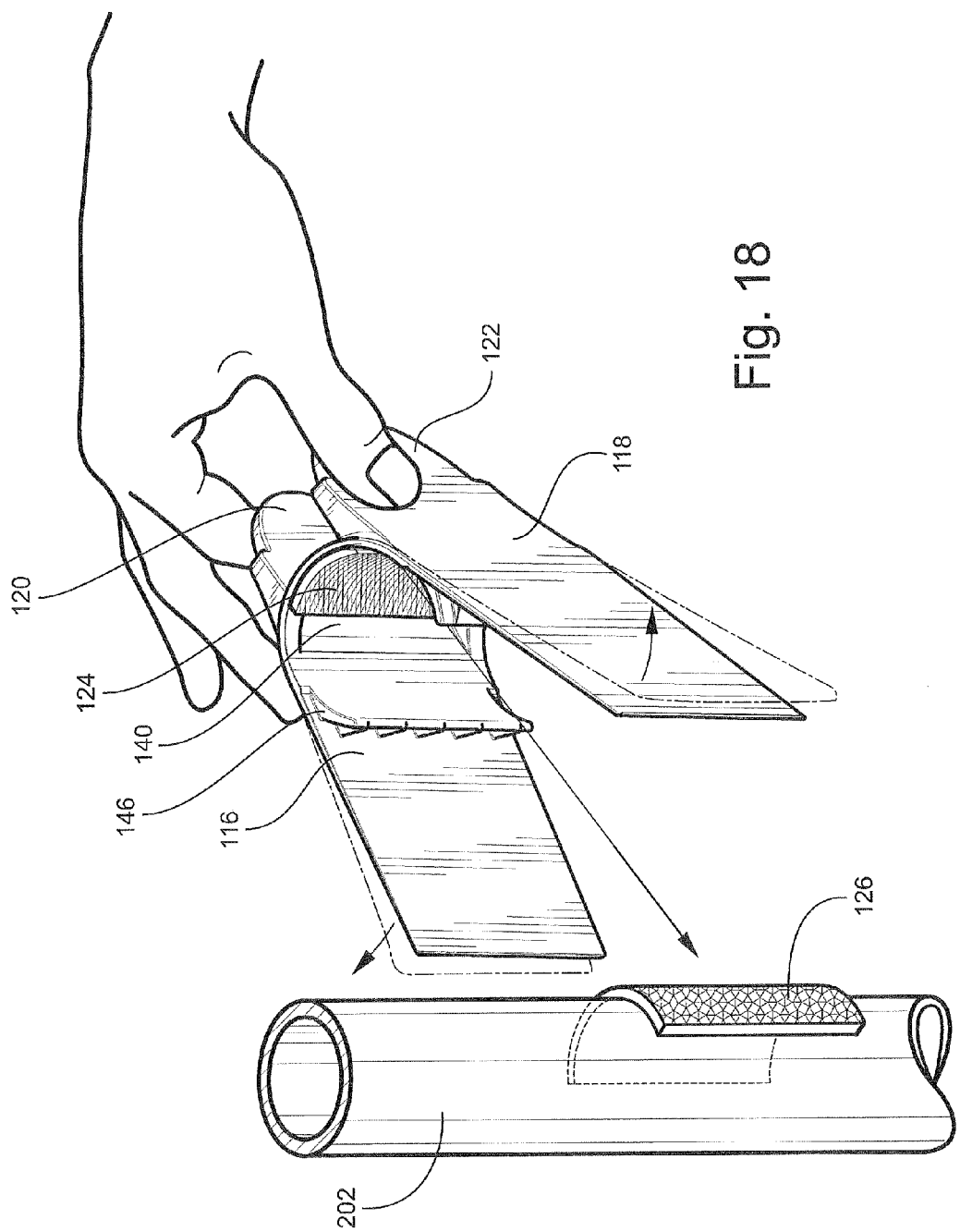
FIG. 18 is an environmental perspective view of the sound making apparatus of FIG. 7.
Figure 19:
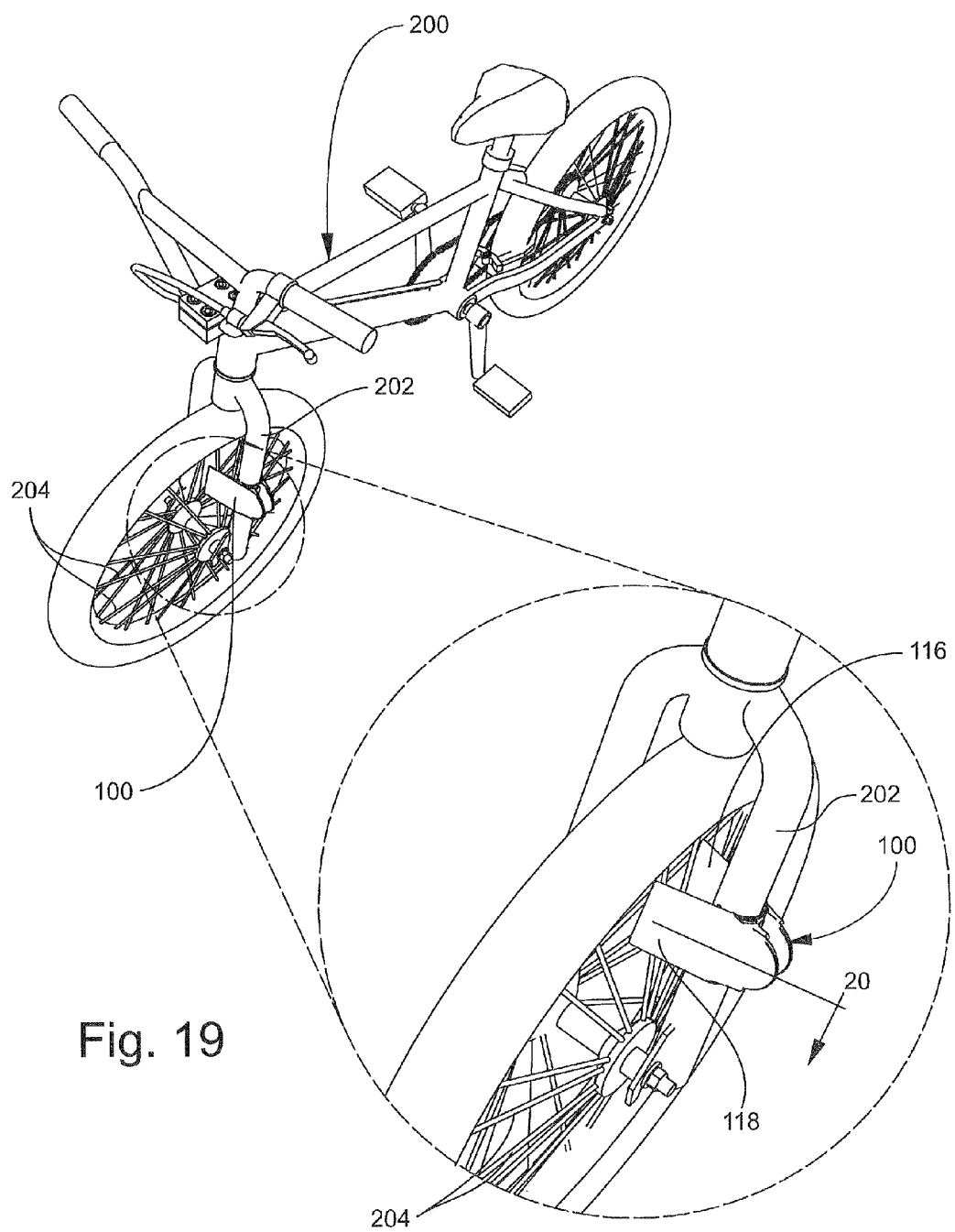
FIG. 19 is another environmental perspective view of the sound making apparatus of FIG. 7.

In a preferred method of using the apparatus 100, the plastic covering is peeled off of the loop fastener strip 126 to expose the adhesive, and the strip 126 is adhered to the bicycle fork 202, as shown in FIG. 18. The user peels away the back and positions the loop fasteners strip 126 at the approximate mid-point of the bicycle fork 202 facing outward, as shown in FIG. 19.

The user grasps the apparatus 100 by the ears 120, 122 and presses the ears 120, 122 together to widen the opening defined by the arcuate section 112. In this widened condition, the user places the arcuate section 112 of the apparatus 100 over the fork of the bicycle such that the hook fasteners 124 on the arcuate section 112 engage the loop fasteners 126 on the fork of the bicycle, and the panels 116, 118 are positioned within the path of the bicycle spokes 204, as shown in FIG. 19. The user then releases the ears 120, 122, and the arcuate section 112 returns to the 220 degree arc at rest, thereby tightening its grip on the bicycle fork 202 and facilitating tight mating between the hook fasteners 124 fasteners of the apparatus 100 and the loop fasteners 126 adhered on the bicycle fork 202. This results in a secure attachment of the apparatus 100 to the bicycle that can withstand the force of repeated contact with the bicycle spokes 204. The engaged hook 124 fasteners and loop fasteners 126 act as a shock absorber, thereby easing the torque on the apparatus 100 resulting from contact with moving spokes 204.

The user pedals the bicycle 200 causing the wheels to turn and the spokes 204 to repeatedly contact the two panels 116, 118. The mating of the hook and loop fasteners 124, 126 minimizes side to side rotation of the apparatus 100. The successive contact of the spokes 204 against the two panels 116, 118 produce a syncopated sound similar to a twin cylinder engine of a motorcycle. The combination of the 220 degree arcuate section 112 and the hook 124 and loop 126 engagement securely maintains the apparatus 100 on the bicycle 200 as the bicycle spokes 204 contact the panels 116, 118. To increase and enhance the sound generated, the user can attach a second apparatus to the bicycle 200.

When it is desired to remove the apparatus 100 from the bicycle 200, the user presses the ears 120, 122 together to widen the arcuate section 112, and pulls the apparatus 100 off the bicycle fork 202.

The single piece plastic construction of the apparatus 100 helps prevent interruption of the sound transferred syncopation of the two panels 116, 118, which can occur in other sound making devices due to multiple breaks caused by the use of multiple parts or by individual panels being inserted separately into the path of the spokes. Furthermore, other sound making devices utilizing only one panel cannot provide the syncopated motorcycle type sound produced by the sound making apparatus 100 of the present invention.

Vibration of the apparatus 100, in combination with the hollow construction of the ears 120, 122 produces sound as does a musical speaker. When the speed of the user's bicycle 200 increases, vibration of the apparatus 100 increases, resulting in the generation of increasingly higher pitch sound. The faster the user pedals on his bicycle 200, the higher the pitch generated, and conversely, the slower the bicycle 200 moves, the lower the pitch generated. As such, the apparatus 100 can be a musical instrument, in which one can record the sounds generated by the apparatus 100 at varying speeds, edit the resulting sounds in a desired sequence, and create a song using the apparatus 100.

The loud syncopated sound produced by the sound making apparatus 100 of the present invention can promote safety by alerting drivers of nearby motor vehicles. Also, the apparatus 100 can be colored in a fluorescent color for safety while riding at night. The apparatus 100 can be installed on a bicycle and removed therefrom without any tools. The entertaining sound generated by the apparatus 100 promotes exercise and physical fitness. Although the apparatus 100 is described above as being used in conjunction with a bicycle 200, it can be used with other conveyances, such as unicycles and tricycles.

A sound making apparatus for use on a bicycle and a method of using same are described above. Various changes can be made to the invention without departing from its scope. The above description of the preferred embodiments and best mode of the invention are provided for the purpose of illustration only and not limitation—the invention being defined by the following claims and equivalents thereof.

What is claimed is:

1. A sound generating apparatus comprising:
   (a) a substantially U-shaped member having first and second panels, and having an inner surface and an outer surface;
   (b) an arcuate section positioned on the inner surface of the U-shaped member for receiving and frictionally engaging a part of a bicycle fork;
   (c) first and second ear sections positioned on the outer surface of the U-shaped member, each of the ear sections having an outer side and an inner side whereby exerting pressure on the outer sides of the ear sections widens an opening defined by the arcuate section to receive the bicycle fork part, and releasing the pressure on the ear sections allows the arcuate section to tighten around the bicycle fork part and frictionally engage the bicycle fork part; and
   (d) wherein the arcuate section comprises a first curved member positioned on the inner surface of the first panel, and a second curved member positioned on the inner surface of the second panel, wherein a distance between an edge of the first curved member and an edge of the second curved member define the opening in the arcuate section, and exerting pressure on the outer sides of the ear sections increases the distance between the edge of the first curved member and the edge of the second curved member, and further wherein the first panel and the second panel define a central portion therebetween, and further comprising attachment means positioned on the central portion for mating with a complementary fastener.

2. A sound generating apparatus according to claim 1, wherein the attachment means comprises a plurality of hook fasteners for mating with complementary loop fasteners.

3. A sound generating apparatus according to claim 2, wherein the hook fasteners are integrally formed on the central portion.

4. A sound generating apparatus according to claim 2, wherein the hook fasteners are adhered to the central portion.

5. A sound generating apparatus according to claim 1, further comprising a first elongate cavity formed in the inner surface of the U-shaped member proximate the first curved member, and a second elongate cavity formed in the inner surface of the U-shaped member proximate the second curved member, wherein the first cavity communicates with the first ear section, the second cavity communicates with the second ear section, and the first and second cavities define a central portion therebetween.

6. A sound generating apparatus according to claim 5, further comprising:
   (a) attachment means positioned on the central portion for mating with a complementary fastener, wherein the attachment means comprises one of the group consisting of hook fasteners and loop fasteners; and
   (b) a first plurality of gussets connected to the first curved member and the inner surface of the first panel to reinforce the first curved member, and a second plurality of gussets connected to the second curved member and the inner surface of the second panel to reinforce the second curved member.

7. A sound generating apparatus kit comprising:
   (a) a substantially U-shaped member having first and second panels, and having an inner surface and an outer surface;
   (b) an arcuate section positioned on the inner surface of the U-shaped member for receiving and frictionally engaging a part of a bicycle fork;
   (c) first and second ear sections positioned on the outer surface of the U-shaped member, each of the ear sections having an outer side and an inner side whereby exerting pressure on the outer sides of the ear sections widens an opening defined by the arcuate section to receive the bicycle fork part, and releasing the pressure on the ear sections allows the arcuate section to tighten around the bicycle fork part and frictionally engage the bicycle fork part; and
   (d) a first fastener positioned on the arcuate section; and
   (e) a second fastener for attaching to the bicycle fork and adapted for complementary engagement with the first fastener, whereby the sound generating apparatus is securely held to the bicycle fork during use.

8. A sound generating apparatus kit according to claim 7, wherein the first fastener comprises a plurality of hook fasteners, and the second fastener comprises an adhesive strip having a plurality of loop fasteners, whereby the strip can be adhered to the bicycle fork.

9. A method for generating sound on a bicycle comprising the steps of:
   (a) providing a bicycle comprising at least one bicycle fork and at least one wheel having spokes;
   (b) providing a sound generating apparatus comprising:
      (i) a substantially U-shaped member having first and second panels, and having an inner surface and an outer surface,
      (ii) an arcuate section positioned on the inner surface of the U-shaped member for receiving and frictionally engaging a desired part of a bicycle fork,
      (iii) first and second ear sections positioned on the outer surface of the U-shaped member, each of the ear sections having an outer side and an inner side whereby exerting pressure on the outer sides of the ear sections widens an opening defined by the arcuate section to receive the bicycle fork part, and
(iv) a plurality of hook fasteners positioned on the arcuate section;
(c) providing an adhesive strip having a plurality of loop fasteners;
(d) applying the adhesive strip to the desired part of the bicycle fork; and
(e) exerting pressure on the outer sides of the ear sections to widen the opening defined by the arcuate section;
(f) positioning the sound generating apparatus on the bicycle fork, wherein the hook fasteners of the arcuate section engage the loop fasteners on the adhesive strip and the panels of the apparatus are positioned within the path of spokes of the bicycle; and
(g) releasing the pressure on the ear sections to allow the arcuate section to tighten around the bicycle fork part.

10. A method according to claim 9, further comprising the step of pedaling the bicycle at a desired speed to generate a desired pitch of sound, wherein an increase in the speed of the bicycle generates a higher pitch sound, and a decrease in the speed of the bicycle generates a lower pitch sound.

11. A sound generating apparatus according to claim 1, wherein the arcuate section defines an arc of about 220 degrees.

12. A sound generating apparatus according to claim 1, wherein the arcuate section is integrally formed on the inner surface of the U-shaped section, and the first and second ear sections are integrally formed on the outer surface of the U-shaped section.

13. A sound generating apparatus according to claim 1, wherein the apparatus is formed of a single piece of plastic.

14. A sound generating apparatus according to claim 1, wherein the first and second panels include rounded bottom edges.

15. A sound generating apparatus kit according to claim 7, wherein the arcuate section is integrally formed on the inner surface of the U-shaped section, and the first and second ear sections are integrally formed on the outer surface of the U-shaped section.

16. A sound generating apparatus kit according to claim 7, further comprising a ledge formed proximate a bottom edge of each of the first and second panels.

17. A sound generating apparatus kit according to claim 7, wherein the arcuate section defines an arc of about 220 degrees.

18. A sound generating apparatus kit according to claim 7, wherein the first and second panels include rounded bottom edges.

19. A sound generating apparatus kit according to claim 7, wherein the arcuate section comprises a first curved member positioned on the inner surface of the first panel, and a second curved member positioned on the inner surface of the second panel, wherein a distance between an edge of the first curved member and an edge of the second curved member define the opening in the arcuate section, and exerting pressure on the outer sides of the ear sections increases the distance between the edge of the first curved member and the edge of the second curved member.

20. A sound generating apparatus kit according to claim 19, further comprising a first plurality of gussets connected to the first curved member and the inner surface of the first panel to reinforce the first curved member, and a second plurality of gussets connected to the second curved member and the inner surface of the second panel to reinforce the second curved member.

* * * * *